United States Patent
Forde et al.

(10) Patent No.: US 9,939,927 B2
(45) Date of Patent: Apr. 10, 2018

(54) KEYPLATE SYSTEM FOR AN INPUT DEVICE

(71) Applicant: Logitech Europe S.A., Lausanne (CH)

(72) Inventors: Kevin Forde, Cork (IE); Davin O'Mahony, Midleton (IE); Niall White, Golden County (IE); Frederic Fortin, Annemasse (FR); Christian Castellaro, Monthey (CH); Fabrice Sauterel, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 15/145,186

(22) Filed: May 3, 2016

(65) Prior Publication Data

US 2017/0220139 A1    Aug. 3, 2017

Related U.S. Application Data

(60) Provisional application No. 62/289,894, filed on Feb. 1, 2016.

(51) Int. Cl.
*G06F 3/0354* (2013.01)
*G06F 3/02* (2006.01)
*G06F 3/038* (2013.01)

(52) U.S. Cl.
CPC ........ *G06F 3/03543* (2013.01); *G06F 3/0202* (2013.01); *G06F 3/0383* (2013.01)

(58) Field of Classification Search
CPC ... G06F 3/03543; G06F 3/0202; G06F 3/0383
See application file for complete search history.

(56) References Cited

U.S. PATENT DOCUMENTS

| | | | | |
|---|---|---|---|---|
| 2007/0251810 A1* | 11/2007 | Corcoran | ............ | G06F 3/03543 200/276.1 |
| 2009/0009473 A1* | 1/2009 | Ho | ....................... | G06F 3/03543 345/163 |
| 2011/0084905 A1* | 4/2011 | Chang | ................... | G06F 3/03543 345/163 |
| 2011/0279371 A1* | 11/2011 | Ma | ....................... | G06F 3/03543 345/163 |
| 2013/0141333 A1* | 6/2013 | Chen | ................... | G06F 3/03543 345/163 |

* cited by examiner

*Primary Examiner* — Lixi C Simpson
(74) *Attorney, Agent, or Firm* — Kilpatrick Townsend & Stockton LLP (57) ABSTRACT

An input device including a housing and a depressible key plate disposed thereon. The key plate includes a front user-accessible portion, a pivot support portion, and a rear portion. A shaft is disposed in the pivot support portion, where the key plate rotates with respect to the shaft. A force sensor is disposed in the housing and in contact with a bottom surface of the front portion of the key plate, and activates in response to receiving a predetermined force by the bottom surface of the front portion of the key plate. The depressible key plate depresses in response to receiving a predetermined depression force on the top surface. A biasing mechanism is disposed in the housing and in contact with the bottom surface of the rear portion of the key plate to provide an upward force tuned to be substantially equal to the predetermined depression force.

17 Claims, 7 Drawing Sheets

KEYPLATE SYSTEM FOR AN INPUT DEVICE

CROSS-REFERENCES TO RELATED APPLICATIONS

This application is a non-provisional application and claims the benefit and priority of U.S. Provisional Application No. 62/289,894, filed on Feb. 1, 2016, titled "KEY PLATE SYSTEM FOR AN INPUT DEVICE," which is hereby incorporated by reference in its entirety for all purposes.

BACKGROUND

Input devices are ubiquitous in modern culture and are typically used to convert analog inputs (e.g., touches, clicks, motions, touch gestures, button presses, scroll wheel rotations, etc.) into digital signals for computer processing. An input device can include any device used to provide data and control signals to a computing system. Some non-limiting examples of input devices include computer mice, keyboards, remote controls, gaming controllers, joysticks, trackballs, and the like. Some non-limiting examples of computing systems include desktops, laptops, tablets and "phablet" computers, smart phones, personal digital assistants (PDA), wearable devices (e.g., smart watches), and the like.

Some input devices are designed to conform to the general needs of the population for a basic, low-cost, functional design. However, basic functionality may not provide enough for more discerning users. Those in the computer gaming community typically expect very high precision input devices to meet their expectations for functions, features, and ergonomics. Thus, there is a need for higher precision input devices with functions that maintain consistency, reliability, and precision over extended periods of use.

BRIEF SUMMARY

Certain embodiments of the invention include an input device (e.g., computer mouse) with at least one high precision button (e.g., key plate) that exhibits consistent and reliable performance characteristics over tens of thousands of hours of use or more. Some embodiments utilize a key plate that is rotatably coupled to a hinge for a highly durable, low-friction operation with excellent dimensional stability. A front portion of the key plate can be coupled to a switch (e.g., actuator, force sensor, etc.) that, when activated, generates a control signal (e.g., button click). In some embodiments, the total force required to activate the switch includes a force required to depress the key plate plus an amount of force required to depress the switch. A biasing mechanism (e.g., spring) can be used to provide a force on a back portion of the key plate and may be tuned to match or substantially match (e.g., within 10%, 5%, 2%, 1%, etc.) the force required to depress the key plate on the switch. Thus, the force required to depress the key plate can be effectively eliminated leaving only the force required to activate (e.g., depress) the switch. This structural arrangement can provide exceptional consistency, accuracy, and stability in button activation over long term use.

In certain embodiments, an input device includes a housing and a depressible key plate disposed on the housing. The key plate can include a front user-accessible portion including a top surface to receive a user force normal to the top surface and a bottom surface, a pivot support portion, and a rear portion including a bottom surface. A shaft can be disposed in the pivot support portion, where the key plate rotates with respect to the shaft. In some cases, the shaft can be a metal shaft and the key plate may be hingeably coupled to the key plate. A force sensor can be disposed in the housing and in contact with the bottom surface of the front portion of the key plate, where the force sensor can activate in response to receiving a predetermined force by the bottom surface of the front portion of the key plate. The input device can further include a biasing mechanism disposed in the housing and in contact with the bottom surface of the rear portion of the key plate to provide an upward force to the bottom surface of the rear portion of the key plate, which may translate to a downwards force on the force sensor. In some implementations, the force provided by the biasing mechanism may be the same or substantially the same (e.g., within 5 g-10 g) as the force required to depress the key plate. In some embodiments, the biasing mechanism can be a spring or other device used to store mechanical energy.

The depressible key plate can be configured to be depressed in response to receiving at least a predetermined depression force on the top surface, and where the upward force provided by the biasing mechanism is substantially equal to the predetermined depression force. In some cases, the predetermined depression force can be between 5 g to 25 g of force, and may be 20 g of force in exemplary embodiments. The force sensor can be coupled (e.g., attached) to the housing and may be an actuator. The predetermined force to activate the force sensor can be between 50 g to 70 g of force, and may be 60 g of force in certain exemplary embodiments. The pivot support portion can be comprised of a polyoxymethylene (POM) material. POM can improve the operating life of key plate systems because POM wears less than other easy to mold plastics that are found on most conventional input devices (e.g., key structures).

In alternative embodiments, the biasing mechanism can be tunable to provide a range of upward forces on the bottom surface of the rear portion of the key plate. Some embodiments may include a user-accessible control to change the upward force provided by the tunable biasing mechanism. The input device can include a processor to control the force sensor. The force sensor, when activated, can generate an activation signal, where the processor generates a control signal based on the activation signal to control a computing device (e.g., desktop, laptop, or tablet computer) coupled to the input device.

In certain embodiments, a computer mouse includes a chassis and a key plate disposed in the chassis. The key plate can include a front portion with a top surface and a bottom surface, a pivot support portion, and a rear portion including a bottom surface. The computer mouse can include a pivot support plate attached to the chassis, the pivot support plate including a shaft to couple to the pivot support portion, where the key plate rotates with respect to the shaft. A switch can be attached to the chassis to activate in response to receiving a predetermined activation force provided by the bottom surface of the front portion of the key plate. A biasing mechanism can be disposed in the housing and in contact with the bottom surface of the rear portion of the key plate to provide an upward force to the bottom surface of the rear portion of the key plate. In some cases, the key plate depresses in response to receiving at least a predetermined depression force substantially normal to the top surface. The upward force provided by the biasing mechanism can be substantially equal to the predetermined depression force.

In certain implementations, the switch can be directly or indirectly attached to the chassis. The shaft can be a metal shaft for improved strength, durability, and reduced friction. The predetermined activation force to activate the switch can be 60 g of force, or other suitable activation threshold value, as would be appreciated by one of ordinary skill in the art. The pivot support plate can include a shaft support that houses the shaft, and the pivot support portion can be comprised of a polyoxymethylene (POM) material. In some embodiments, the biasing mechanism can be tunable to change the upward force provided by the biasing mechanism on the bottom surface of the rear portion of the key plate, and the computer mouse can include a user-accessible control to tune the upward force provided by the biasing mechanism.

In some embodiments, an input device includes a chassis, a depressible key plate disposed in the chassis, the key plate including a front portion and a rear portion, where the depressible key plate is depressed in response to receiving a predetermined pressing force on the front portion of the key plate, a biasing mechanism disposed in the chassis and coupled to the rear portion of the key plate to provide a restoration force to the key plate that is substantially equal to the predetermined pressing force, and a switch attached to the chassis to generate a control signal in response to receiving a predetermined activation force by the front portion of the key plate when the front portion of the key plate is depressed. The key plate can include a center portion, where the chassis includes a metal shaft that passes through the center portion such that the key plate is rotatably coupled to the metal shaft. In some cases, the center portion may be comprised of a polyoxymethylene (POM) material.

BRIEF DESCRIPTION OF THE DRAWINGS

The detailed description is set forth with reference to the accompanying figures.

DETAILED DESCRIPTION

Embodiments of this invention are generally directed to input devices. More specifically, systems and devices relate to an improved key plate system for an input device.

In the following description, for purposes of explanation, numerous examples and details are set forth in order to provide an understanding of embodiments of the present invention. It will be evident, however, to one skilled in the art that certain embodiments can be practiced without some of these details, or can be practiced with modifications or equivalents thereof.

Certain embodiments of the invention include an input device (e.g., computer mouse) with at least one high precision button (e.g., keyplate) that exhibits consistent and reliable performance characteristics over tens of thousands of hours of use or more. Some embodiments utilize a key plate that is rotatably coupled to a metal hinge for a highly durable, low-friction operation with excellent dimensional stability. A front portion of the key plate can be coupled to a switch (e.g., actuator, force sensor, etc.) that, when activated, generates a control signal (e.g., button click). The total force required to activate the switch can include a force required to depress the key plate plus the amount of force required to depress the switch. A biasing mechanism (e.g., a spring) can be used to provide a force on a back portion of the key plate and may be tuned to match or substantially match (e.g., within 10%, 5%, 2%, 1%, etc.) the force required to depress the key plate on the switch. Thus, the force required to depress the key plate may be effectively eliminated leaving only the force required to activate (e.g., depress) the switch. This structural arrangement can provide exceptional consistency, accuracy, and stability in button activation over long term use.

Figure 1:
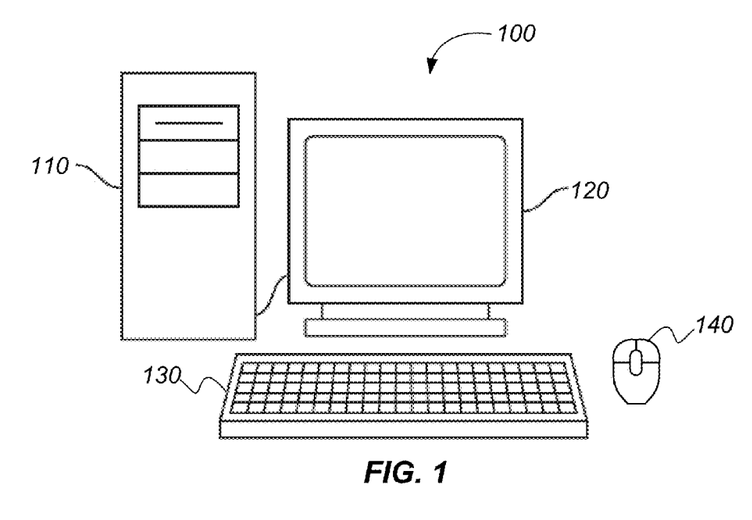
FIG. 1 is a simplified diagram of a computer system, according to certain embodiments.

FIG. 1 is a simplified diagram of a computer system 100, according to certain embodiments. Computer system 100 includes computer 110, monitor 120, keyboard 130, and input device 140. In some embodiments, input device 140 can be a computer mouse, a remote control device, a game controller (e.g., game pad, joystick, game controller, etc.), a mobile device, or any other suitable device that can be used to convert analog input signals into digital signals for computer processing. For computer system 100, input device 140 can be configured to control various aspects of computer 110 and monitor 120.

Computer 110 can be any suitable computing device including, but not limited to, a desktop computer, a laptop computer, a tablet or "phablet" computer, a smart phone, a PDA, a wearable devices (e.g., smart watches), or the like. In some embodiments, input device 140 can be configured to provide control signals for movement tracking (e.g., x-y movement on a planar surface, three-dimensional "in-air" movements, etc.), touch/gesture detection, lift detection, orientation detection, power management methods, input detection (buttons, scroll wheels, etc.), output functions (LED control, haptic feedback, etc.), and a host of additional features that would be appreciated by one of ordinary skill in the art. Computer 110 may include a machine readable medium (not shown) that is configured to store computer code, such as mouse driver software, where the computer code is executable by a processor (not shown) of computer 110 to affect control of computer 110 by input device 140 and keyboard 130. The various embodiments described herein generally refer to input device 140 as a computer mouse or similar input device, however it should be understood that input device 140 can be any suitable input/output (I/O) device (e.g., user interface device, control device, input unit, or the like).

Figure 2:
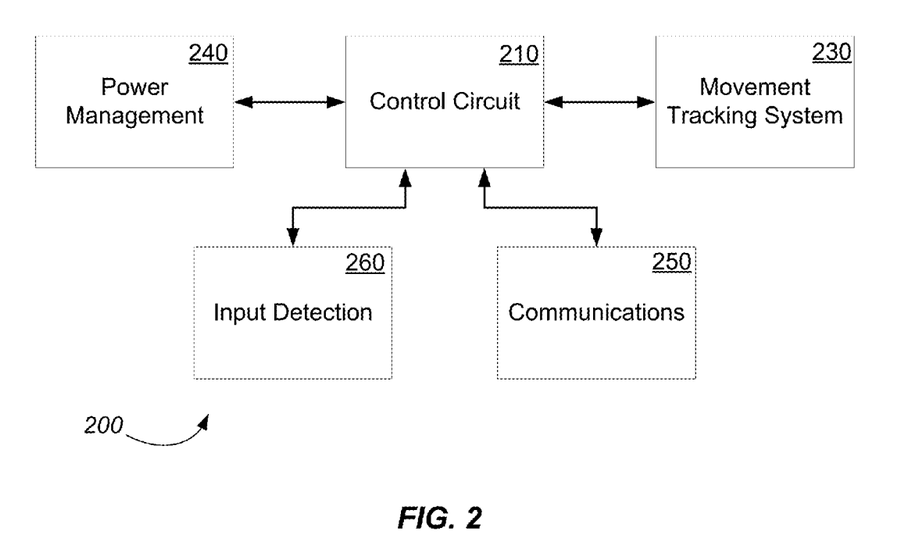
FIG. 2 is a simplified block diagram of a system configured to operate an input device, according to certain embodiments.

FIG. 2 is a simplified block diagram of a system 200 configured to operate input device 140, according to certain embodiments. System 200 includes processor(s) 210, input detection block 220, movement tracking block 230, power management block 240, and communication block 250. Each of system blocks 220-250 can be in electrical communication with processor 210. System 200 may further include additional systems that are not shown or discussed to prevent obfuscation of the novel features described herein.

In certain embodiments, processor 210 comprises one or more microprocessors (μCs) and can be configured to control the operation of system 200. Alternatively, processor 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Alternatively, MCUs, μCs, DSPs, and the like, may be configured in other system blocks of system 200. For example, communications block 250 may include a local processor to control communication with a computer 110 (e.g., via Bluetooth, Bluetooth LE, RF, IR, hardwire, Zigbee, Logitech Unifying, or other communication protocol). In some embodiments, multiple processors may provide an increased performance in system 200 (e.g., speed and bandwidth). It should be noted that although multiple processors may improve system performance, they are not required for standard operation of the embodiments described herein.

Input detection block 220 can control the detection of button activation (e.g., main buttons, side buttons, etc.), scroll wheel manipulation, sliders, switches, touch sensors (e.g., one and/or two-dimensional touch pads), and the like. In some embodiments, input detection block 220 (or processor 210) can detect the activation of force sensor 450 when key plate 310 is depressed with a sufficient force (see below with respect to FIGS. 3 and 4) and generate a subsequent control signal to control a computing device (e.g., computer 110) coupled to the input device (e.g., a detecting a "left click" on a computer mouse button and generating a corresponding control signal). Alternatively, the functions of input detection block 220 can be subsumed by processor 210, or in combination therewith.

In some embodiments, input detection block 220 can be configured to detect a touch or touch gesture on one or more touch sensitive surfaces on input device 140. Input detection system 220 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically be configured to detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of input device 140 may not utilize touch detection or touch sensing capabilities.

Input detection block 220 can include touch and/or proximity sensing capabilities. Some examples of the types of touch/proximity sensors that may be used include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with some microphones to detect the modification of the wave propagation pattern related to touch points, etc.), or the like.

Movement tracking block 230 can be configured to track a movement of input device 140. Movement tracking block 230 can use optical sensors such as light-emitting diodes (LEDs) or an imaging array of photodiodes to detect a movement of input device 140 relative to an underlying surface. Input device 140 may optionally include movement tracking hardware that utilizes coherent (laser) light. In certain embodiments, one or more optical sensors are disposed on the bottom side of input device 140 (not shown). Movement tracking block 230 can provide positional data (e.g., X-Y coordinate data) or lift detection data. For example, an optical sensor can detect when a user lifts input device 140 off of a work surface and can send that data to processor 210 for further processing.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse." Accelerometers can further determine if input device 140 has been lifted off of a surface and provide movement data that may include the velocity, physical orientation, and acceleration of input device 140. In some embodiments, gyroscope(s) can be used in lieu of or in conjunction with accelerometer(s) to determine movement or input device orientation.

Power management block 240 can be configured to manage power distribution, recharging, power efficiency, and the like, for input device 140. In some embodiments, power management block 240 can include a battery (not shown), a USB based recharging system for the battery (not shown), power management devices (e.g., low-dropout voltage regulators—not shown), and a power grid within system 200 to provide power to each subsystem (e.g., communications block 250, etc.). In certain embodiments, the functions provided by power management system 240 may be incorporated into processor 210. Alternatively, some embodiments may not include a dedicated power management block. For example, functional aspects of power management block 240 may be subsumed by another block (e.g., processor 210) or in combination therewith.

Communications block 250 can be configured to provide communication capabilities with computer 110, or other devices and/or peripherals, according to certain embodiments. Communications block 250 can be configured to provide wireless connectivity (e.g., radio-frequency (RF), Bluetooth, BLE, infra-red, Zigbee, Logitech Unifying, or the like) to computer 110 or other wireless devices. System 200 may include a hardwired connection to computer 110 (e.g., USB, FireWire, etc.). For example, input device 140 can be configured to receive a Universal Serial Bus (USB) cable to enable bi-directional electronic communication with computer 110 or other external devices. Some embodiments may utilize different types of cables or connection protocol standards to establish hardwired communication with other entities.

Although certain systems may not expressly discussed, they should be considered as part of system 200, as would be understood by one of ordinary skill in the art. For example, system 200 may include a bus system to transfer power and/or data to and from the different systems therein. In some embodiments, system 200 may include a storage subsystem (not shown). A storage subsystem can store one or more software programs to be executed by processors (e.g., in processor 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., spring auto-calibration, etc.) as described herein.

It should be appreciated that system 200 is meant to be illustrative and that many variations and modifications are possible, as would be appreciated by one of ordinary skill in the art. System 200 can include other functions or capabilities that are not specifically described here (e.g., mobile phone, global positioning system (GPS), power management, one or more cameras, various connection ports for connecting external devices or accessories, etc.). While system 200 is described with reference to particular blocks (e.g., input detection block 220), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks might or might not be reconfigurable depending on how the initial configuration is obtained. Embodiments of the present invention can be realized in a variety of apparatuses including electronic devices implemented using any combination of circuitry and software. Furthermore, aspects and/or portions of system 200 may be combined with or operated by other sub-systems as required by design. For example, power management 240 may operate within processor 210 instead of functioning as a separate entity.

Figure 3:
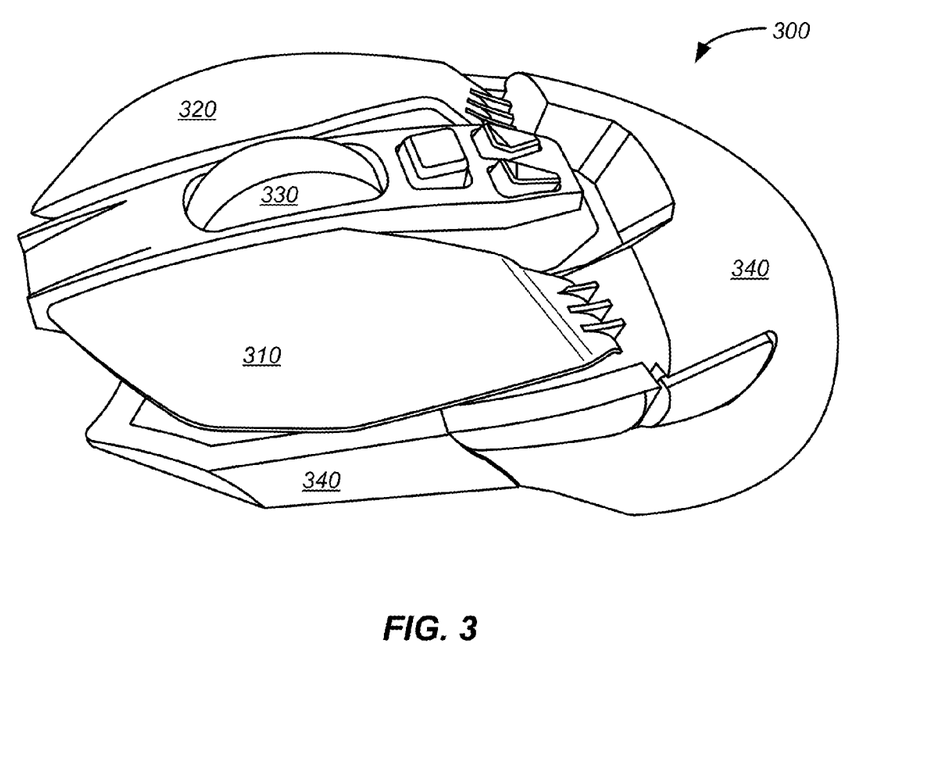
FIG. 3 illustrates an input device, according to certain embodiments.
Figure 4A:
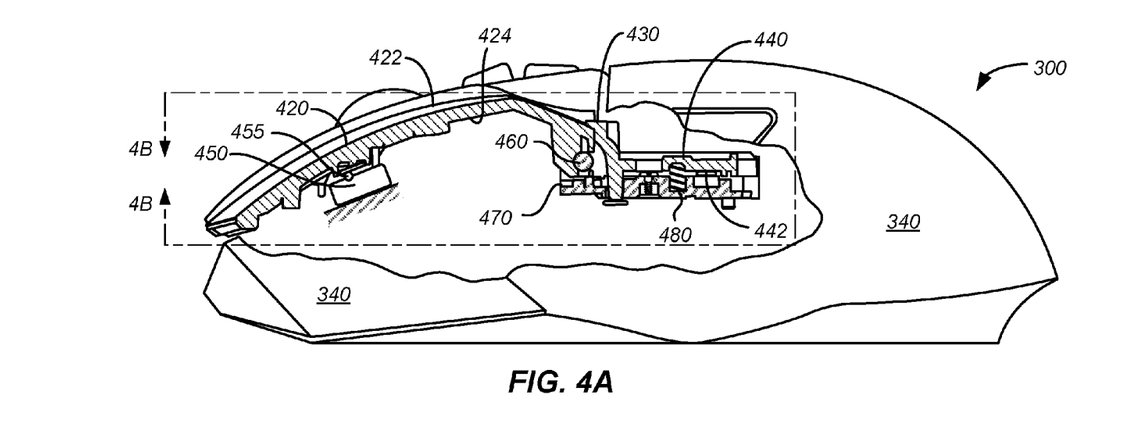
FIG. 4A illustrates a key plate system disposed in housing of input device, according to certain embodiments.
Figure 4B:
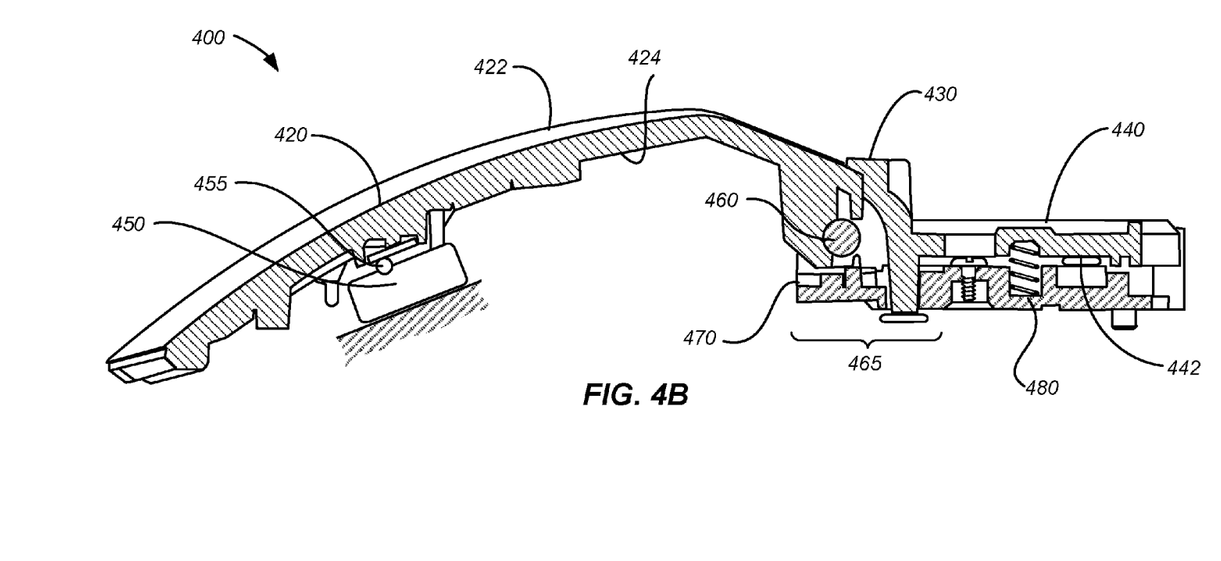
FIG. 4B illustrates a key plate system in an isolated and enlarged view, according to certain embodiments.

FIG. 3 illustrates an input device 300, according to certain embodiments. Input device 300 includes key plate 310 (i.e., left button), key plate 320 (i.e., right button), scroll wheel 330, and housing 340. Housing 340 can be the main body of the device that the key plates 310, 320, scroll wheel 330, LEDs (not shown), PCB(s) (not shown) may be directly or indirectly attached to. A housing can be a chassis or frame. Keyplates 310, 320 can include a user accessible portion and an inaccessible portion embedded in the housing, and may be rotatably coupled to housing 340 via a shaft, as further discussed below with respect to FIG. 4. Input device 300 may include any number of additional input features (e.g., buttons, touch pads, switches, pressure plates, touch sensors, microphones, etc.) or output features (e.g., LEDs, haptic feedback systems, speakers, etc.) as would be understood by one of ordinary skill in the art.

FIG. 4A illustrates a key plate system 400 disposed in housing 340 of input device 300, according to certain embodiments. FIG. 4B shows key plate system 400 in a separated and enlarged view (i.e., removed from housing 340 for easier viewing). Key plate system 400 can include a front portion 420, a center portion 430, and a rear portion 440. Front portion 420 can include a top surface 422 and a bottom surface 424. In some embodiments, a user accessible portion of top surface 422 of front portion 420 is shown, at least in part, in key plate 310 of FIG. 3. Front portion 420 can be positioned to be user-accessible and depressible, for example, to receive a user force generally normal to top surface 422. For instance, some embodiments of key plate system 400 can be a left or right main button on a computer mouse to receive a button actuation force by a user's thumb or finger. Although key plate system 400 is shown and described as part of a computer mouse, key plate system 400 can be applied to any type of input device, as would be appreciated by one of ordinary skill in the art. It should be understood that describing a force that is normal to top surface 422 of key plate system 400 does not necessarily indicate that other forces are not also present. For instance, a user force may be applied at an acute angle relative to the normal of top surface 422. However, a component of that particular force will be experienced by top surface 422. In particular, a portion of a user force can be normal to top surface 422.

Aspects of key plate system 400 (e.g. front portion 420, rear portion 340) can be comprised of plastic (e.g., ABS), composite, carbon fiber, or other sturdy material with flexible properties. Front portion 420 is shown having a long, curved top surface 422 and varied topology on bottom surface 424, however front portion 420 can be of any suitable shape, size (e.g., length, width), contour, or configuration (e.g., position with respect to center portion 430 and rear portion 440) with any suitable surface features as needed by design. Front portion 420 is shown resting on a switch 450 and specifically on actuator 455. Front portion 420 may be depressed in response to a receiving a predetermined depression force, such as a "button click" force, by a user. The predetermined depression force can be approximately 5 g-25 g of force, and in exemplary embodiments, 20 g of force.

Center portion 430 can include a pivot support portion 465 to house a rotatable shaft 460, such that key plate system 400 can rotate with respect to shaft 460. Shaft 460 can be comprised of a metal (e.g., steel, aluminum, alloys, etc.) or other suitable material (e.g., Teflon coated materials, carbon fibers, etc.) that provide improved rigidity, strength, low friction, and durability as compared to plastics or other conventional materials when disposed in pivot support portion 465. In some embodiments, shaft 460 can be rotatably coupled to key plate system 400 and rotatably or fixedly coupled to housing 340. Shaft 460 may be configured to rotate, like an axel, as key plate system 400 flexes and recovers, or shaft 460 may be fixed, with key plate system 400 rotating with respect to shaft 460. Shaft 460 may be coupled to housing 340 via a base structure 470 that can secure shaft 460 in place on pivot support portion 465. Alternatively, housing 340 may include structural features to secure shaft 460 to housing 340 (i.e., performing the function of base structure 470). In some embodiments, pivot support portion 465 can be comprised of a polyoxymethylene (POM) material. Pivot support portion 465 may be comprised of any suitable material like POM that exhibits, e.g., excellent molding and/or wearing properties. Some alternative materials may include urethane-dimethacrylate, high-density polyethylene, polyethylene with copolymers, or the like.

Rear portion 440 can include a top and bottom surface. A biasing mechanism 480 (e.g., a spring) can be disposed in housing 340 and in direct or indirect contact with the bottom surface of rear portion 440 to provide an upward force to the bottom surface of rear portion 440. Biasing mechanism 480 can be coupled to housing 340. Some embodiments may include multiple biasing mechanisms 480. In some embodiments, although key plate system 400 can be rotatably coupled to switch 460, there may be no actual rotation as the upward force provided by biasing mechanism 480 on back portion 440 causes front portion 420 to directly contact force sensor 450. In such cases, a downward force (e.g., user click force) on front portion 420 indirectly causes force sensor to activate 450 with minimal rotation of key plate system 400, if any. In some cases, front portion 420 flexes in response to the downward force, while the remaining portions (center portion 430 and rear portion 440) remain stationary or substantially stationary with little movement (e.g., less than 1 mm of travel).

A force sensor 450 can be disposed in housing 340 and adjacent to bottom surface 424 of front portion 420. In some embodiments, force sensor 450 is in contact with bottom surface of front portion 420 and activates in response to receiving a predetermined force (threshold force). The predetermined force can be received from bottom surface 424 of front portion 420 as the result of a force applied to top surface 422 of user-accessible front portion 420. For instance, when a user presses the key plate, e.g., in a "left click" or "right click" on a computer mouse, as would be understood by one of ordinary skill in the art. Force sensor 450 can be any suitable force sensing device (e.g., switches, force sensing resistors, pressure plates, etc.). In some embodiments, a typical force sensor can be a micro switch 20M life. Alternatively, pressure sensors can be used to allow for a 50-70 gf range. FIG. 4 shows force sensor 450 with activation switch 455 to receive the force from bottom surface 424 of front portion 420. In any configuration (e.g., with or without an activation switch), a force sensor can be configured to be activated in response to receiving a predetermined (threshold or activation) force. The predetermined force ("activation force") may be any suitable range. In some embodiments, the predetermined activation force can be anywhere from 50 g-70 g (exemplary embodiments can be 60 g), although other ranges are possible.

Force sensor 450 can be controlled by a processor (e.g., processor 210) and may generate an activation signal in response to receiving a force at least equal to the predetermined activation force. The controlling processor can generate a control signal based on the activation signal to control an aspect of a corresponding computing device, as further discussed above at least with respect to FIG. 2. For instance, the processor can generate a "left click" control signal indicating a left button press on a computer mouse where the control signal controls a cursor or function on a display device.

In some implementations, force sensor 450 can be directly coupled (e.g., attached) or indirectly coupled (e.g., attached through intermediate structure) to housing 430. This can reduce system tolerances in the overall key plate system 400, as further discussed below.

Figure 5:
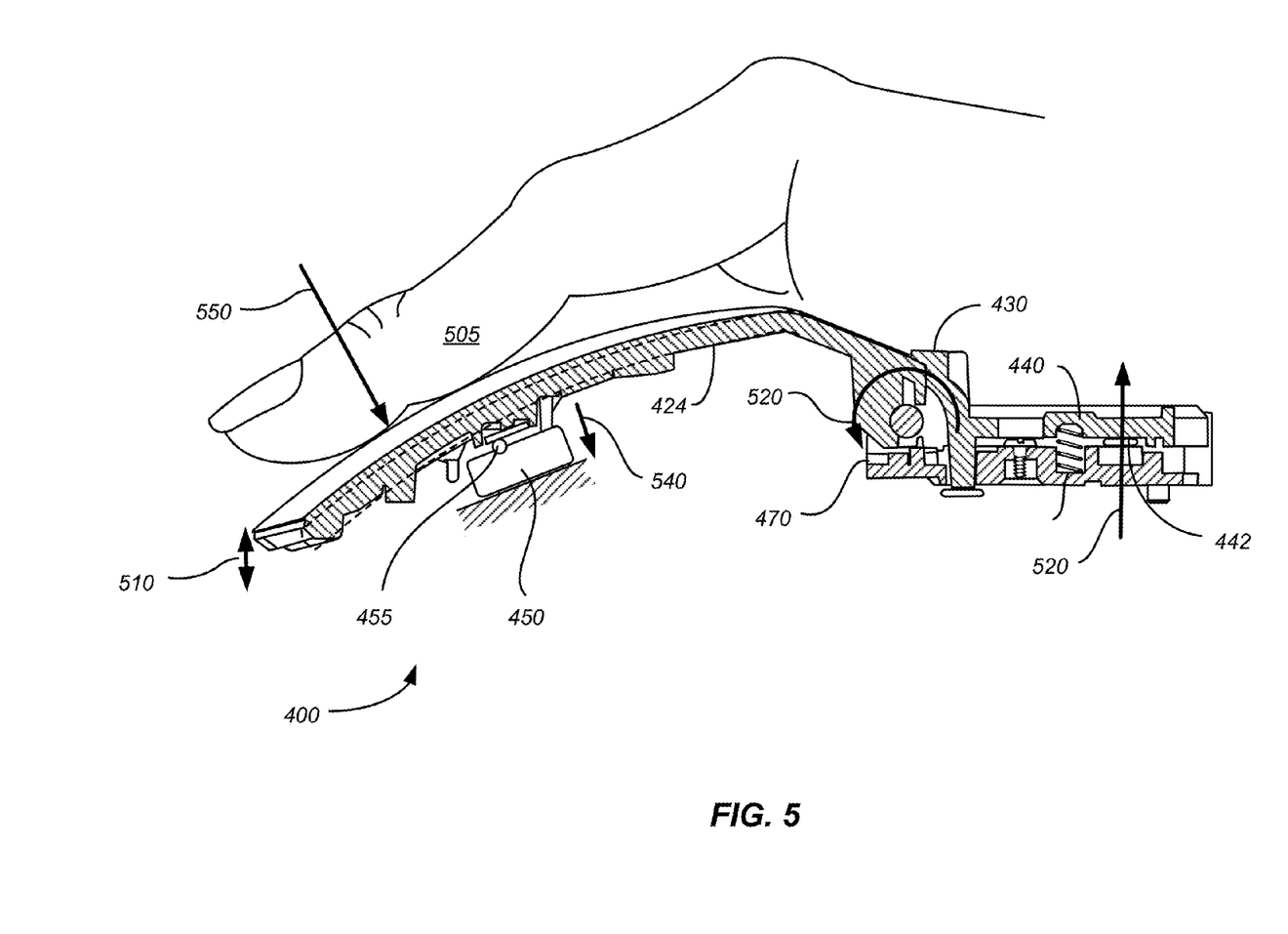
FIG. 5 illustrates a key plate system with external forces applied, according to certain embodiments.

FIG. 5 illustrates a key plate system 400 with external forces applied, according to certain embodiments. A user's finger 505 is shown applying a downward force 550 to top surface 422 of front portion 420 of key plate system 400. Force 550 can be transferred through front portion 420 to force sensor 450. Biasing mechanism 480 can provide a preloading upwards force 520 on the bottom surface of rear portion 440 causing key plate system 400 to rotate 520 with respect to shaft 460, such that bottom surface 424 contacts force sensor 450 when key plate system 400 is at rest (e.g., when no external user forces are being applied). Front portion 420 can flex or bend during operation (movement 510) and may introduce resistances that may require additional forces to be overcome, which can be referred to as a predetermined depression force. In some embodiments, biasing mechanism 480 is tuned (e.g., at manufacturing or user-controlled) to match the predetermined depression force such that the only remaining force required to activate force sensor 450 is only or substantially only its own predetermined (threshold) activation force (e.g., 50-70 g of force). In some embodiments, the predetermined depression force can typically be 5-25 g of force.

Key plate systems may include a number of moving parts, flexible materials, and other features that introduce tolerances into key plate system 400 that can contribute to the predetermined depression force. During manufacturing, biasing mechanism 480 can be tuned to match the predetermined depression force, which may include any number of resistive forces beyond just those introduced by front portion 420, as would be appreciated by one of ordinary skill in the art.

Figure 6:
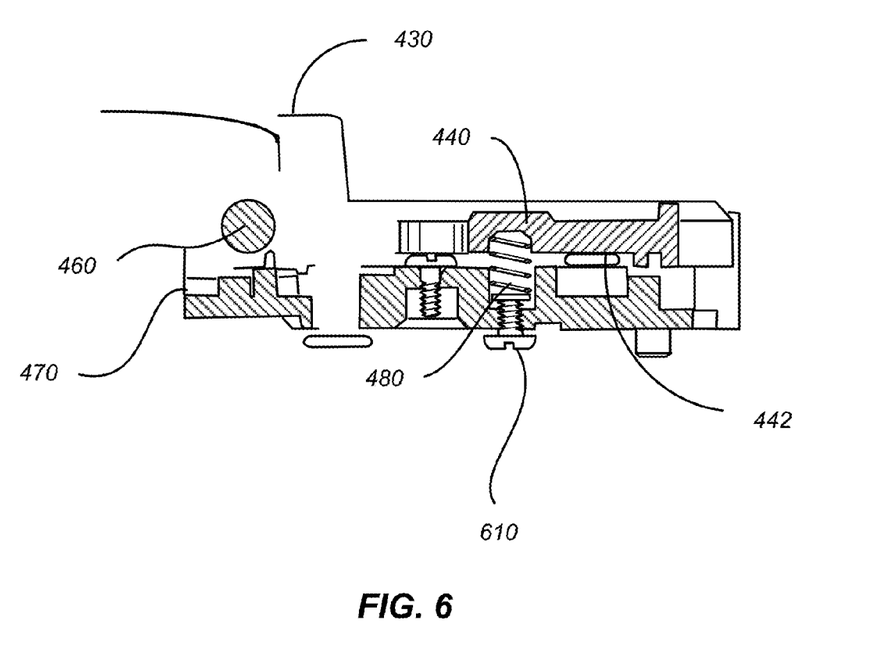
FIG. 6 illustrates a tuning mechanism to tune a preloading biasing mechanism in a key plate system, according to certain embodiments.

FIG. 6 illustrates a tuning mechanism to tune a preloading biasing mechanism in key plate system 400, according to certain embodiments. Tuning mechanism 610 can be a user-accessible control to control the amount of upwards force provided by biasing mechanism 480. Tuning mechanism 610 can be a screw, knob, software-controlled device (e.g., servo), or other suitable user-accessible control that can allow a user to adjust the compression of biasing mechanism 480, thereby affecting the resulting upward force. In some configurations, tuning mechanism 610 can be adjusted to match the predetermined depression force required by key plate system 400 to overcome certain inherent tolerances, as discussed above, leaving only the predetermined activation force to activate force sensor 450. In some embodiments, a tuning mechanism may not be included (e.g., the biasing mechanism may be adjusted during manufacturing and inaccessible by a user after assembly).

In some embodiments, a user may adjust biasing mechanism 480 such that the upward force is greater than the predetermined depression force. For instance, a force sensor may have a predetermined activation force of 60 g. Some users may prefer a more sensitive button activation setting. As such, tuning mechanism 610 can be adjusted to overcome both the predetermined depression force of front portion 410 and, e.g., 20 g of force from force sensor 450 to effectively create a new predetermined activation force of 40 g. Both positive and negative offsets are possible, as would be appreciated by one of ordinary skill in the art.

Figure 7A:
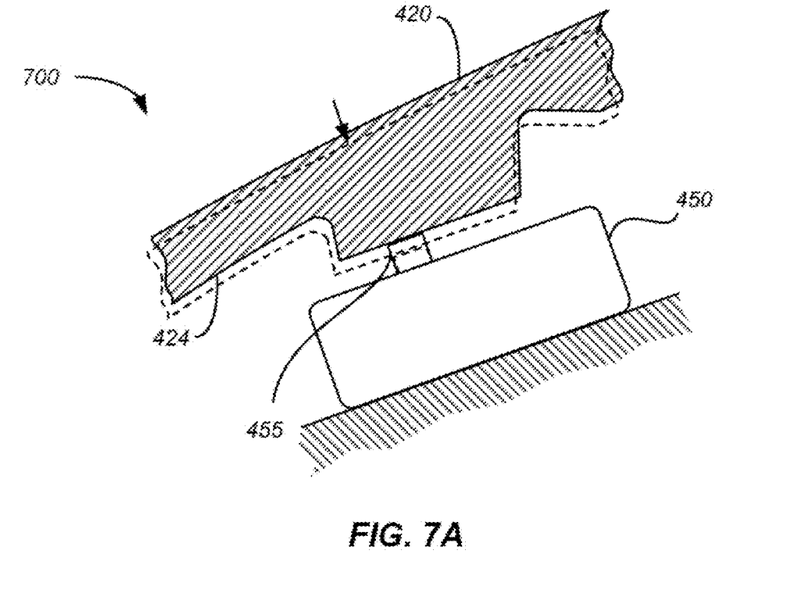
FIG. 7A illustrates a close up view of the interface between a bottom surface of a front portion of a key plate system and a force sensor, according to certain embodiments.

FIG. 7A illustrates a close up view 700 of the interface between bottom surface 424 of front portion 420 and force sensor 450, according to certain embodiments. Front portion 420 and force sensor 450 may be in contact with one another such that no space exists between them, making for a "contactless click" when the button (key plate) is clicked (activated), according to certain embodiments. Alternatively, there may be a small space (e.g., <1 mm) if biasing mechanism 480 is tuned below the predetermined depression force (see FIG. 6). In further embodiments, there may be an intervening structure between front portion 420 and force sensor 450, such as a spacer (not shown). However, such structures may typically be directly coupled (i.e. attached) to both the front portion 420 and force sensor 450 to ensure an efficient transfer of force between the two.

Figure 7B:
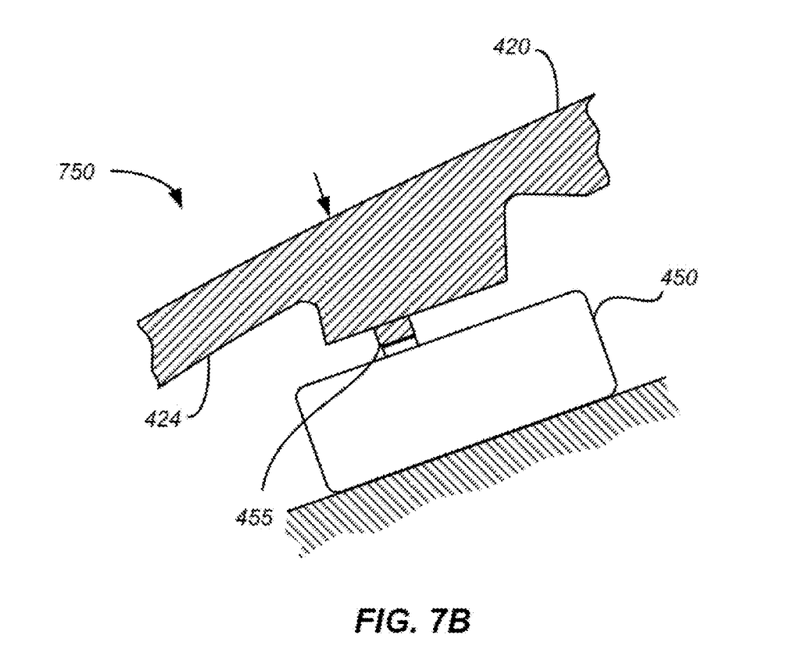
FIG. 7B illustrates a close up view of an interface between a bottom surface of a front portion of a key plate system and a force sensor, according to certain embodiments.

FIG. 7B illustrates a close up view 750 of an interface between bottom surface 424 of front portion 420 and force sensor 450, according to certain embodiments. Front portion 420 can be attached to force sensor 450 by adhesive, ultra-sonic welding, or other suitable material or bonding process. Attaching front portion 420 to force sensor 450 may eliminate the need for a pre-loading biasing mechanism with respect to promoting an efficient transfer of force from user to force sensor. Because the key plate and force sensor are in physical contact, there may be an efficient transfer of force between the two structures. However, such embodiments may not be tunable (or have limited tuning) to accommodate inherent tolerances in the key plate system, as discussed above.

Figure 8:
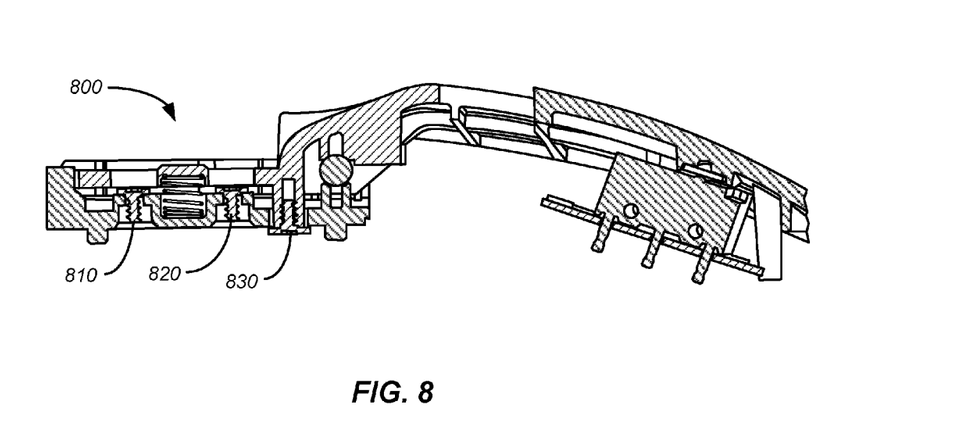
FIG. 8 illustrates a key module system, according to certain embodiments.
Figure 9:
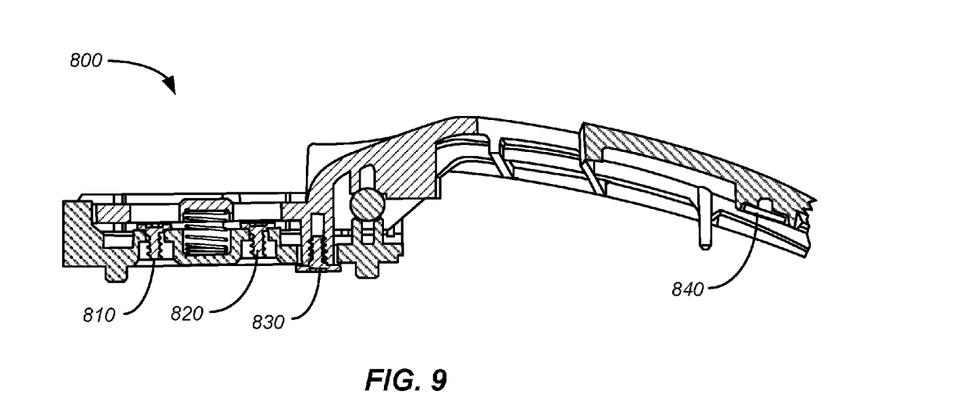
FIG. 9 illustrates a key module system, according to certain embodiments.

FIGS. 8 and 9 show key module system 800, according to certain embodiments. Key module system 800 of FIG. 8 includes an actuator assembly (e.g., switch) and key module system 800 of FIG. 9 is shown without the actuator assembly. Key module systems may be coupled (e.g., attached) to an internal chassis (e.g., housing, base) by a coupling mechanism including, but not limited to, hardware (e.g., screws, tabs, bolts, etc.) adhesive (e.g., glue), or a combination thereof. Key module system 800 may include two screws 810, 820, that couple key module system 800 to the chassis, which secures key module system 800 to the input device (e.g., computer mouse) itself. Some embodiments may include more screws or fewer screws (e.g., 1 screw, as shown in key plate system 400 of FIG. 4). Key plate system 800 can further include an anti-key pop out mechanism 830, such as a screw or other hardware, to prevent key plate system 800 from popping off, misaligning, etc., when the input device is dropped (e.g., at least 90 cm or more). FIG. 9 shows the use of several different materials (e.g., POM, metal, etc.) that may provide improved performance over conventional materials (e.g., plastic). For instance, an actuator pad may be used by the keyplate assembly to contact a corresponding actuator. A POM actuator pad 840 may survive thousands of more contacts with its actuator before end-of-life wear-and-tear sets in as compared to plastic. One of ordinary skill in the art with the benefit of this disclosure would recognize the many modifications, variations, and alternatives that are possible when using POM for the various components of system 800 (or any system described in this disclosure).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An input device comprising:
   a housing;
   a key plate coupled to the housing, the key plate including:
      a front portion including:
         a top surface; and
         a bottom surface;
      a pivot support portion; and
      a rear portion including a bottom surface;
   a shaft coupled to the pivot support portion, wherein the key plate rotates with respect to the shaft;
   a force sensor coupled to the housing and in contact with the bottom surface of the front portion of the key plate, the force sensor configured to activate in response to receiving a predetermined force from the bottom surface of the front portion of the key plate; and
   a biasing mechanism coupled to the housing and in contact with the bottom surface of the rear portion of the key plate, the biasing mechanism configured to provide an upward force to the bottom surface of the rear portion of the key plate.

2. The input device of claim 1 wherein the key plate depresses in response to receiving at least a predetermined depression force on the top surface, and wherein the upward force provided by the biasing mechanism is substantially equal to the predetermined depression force.

3. The input device of claim 2 wherein the predetermined depression force is between 5 g to 25 g of force.

4. The input device of claim 1 wherein the force sensor is an actuator.

5. The input device of claim 1 wherein the predetermined force to activate the force sensor is between 50 g to 70 g of force.

6. The input device of claim 1 wherein the pivot support portion is comprised of a polyoxymethylene (POM) material.

7. The input device of claim 1 wherein the biasing mechanism is tunable to provide a range of upward forces on the bottom surface of the rear portion of the key plate.

8. The input device of claim 7 further including a user-accessible control to change the upward force provided by the tunable biasing mechanism.

9. The input device of claim 1 further including a processor,
  wherein the force sensor is controlled by the processor,
  wherein the force sensor, in response to being activated, generates an activation signal, and
  wherein the processor generates a control signal based on the activation signal, the control signal configured to control a computing device coupled to the input device.

10. A computer mouse comprising:
  a chassis;
  a key plate disposed in the chassis, the key plate including:
    a front portion including a top surface and a bottom surface;
    a pivot support portion; and
    a rear portion including a bottom surface;
  a pivot support plate attached to the chassis, the pivot support plate including a shaft configured to couple to the pivot support portion, wherein the key plate rotates with respect to the shaft;
  a switch attached to the chassis, the switch to activate in response to receiving a threshold activation force received from the bottom surface of the front portion of the key plate; and
  a biasing mechanism disposed in the chassis and in contact with the bottom surface of the rear portion of the key plate, the biasing mechanism configured to provide an upward force to the bottom surface of the rear portion of the key plate,
    wherein the key plate depresses in response to receiving at least a threshold depression force substantially normal to the top surface, and
  wherein the upward force provided by the biasing mechanism is substantially equal to the threshold depression force.

11. The computer mouse of claim 10 wherein the shaft is a metal shaft.

12. The computer mouse of claim 10 wherein the threshold activation force that activates the switch is 60 g of force.

13. The computer mouse of claim 10 wherein the pivot support plate includes a shaft support that houses the shaft, and wherein the pivot support portion is comprised of a polyoxymethylene (POM) material.

14. The computer mouse of claim 10 wherein the biasing mechanism is tunable to change the upward force provided by the biasing mechanism on the bottom surface of the rear portion of the key plate.

15. The computer mouse of claim 14 further including a user-accessible control operable to tune the upward force provide by the biasing mechanism.

16. An input device comprising:
  a chassis;
  a key plate coupled to the chassis, the key plate including a front portion and a rear portion, wherein the key plate is depressed in response to receiving a threshold pressing force on the front portion of the key plate;
  a biasing mechanism disposed in the chassis and coupled to the rear portion of the key plate, the biasing mechanism configured to provide a restoration force to the key plate that is substantially equal to the threshold pressing force; and
  a switch coupled to the chassis that is configured to generate a control signal in response to receiving a threshold activation force from the front portion of the key plate when the front portion of the key plate is depressed,
  wherein the key plate further includes a center portion,
  wherein the chassis includes a metal shaft, and
  wherein the metal shaft passes through the center portion such that the key plate is rotatably coupled to the metal shaft.

17. The input device of claim 16 wherein the center portion is comprised of a polyoxymethylene (POM) material.

* * * * *